March 5, 1963  D. A. PAYNTER  3,080,534
BRIDGE-TYPE TRANSISTOR CONVERTER
Filed April 11, 1960  2 Sheets-Sheet 1

INVENTOR:
DONALD A. PAYNTER,
BY Marvin L. Goldenberg
HIS ATTORNEY.

March 5, 1963  D. A. PAYNTER  3,080,534
BRIDGE-TYPE TRANSISTOR CONVERTER

Filed April 11, 1960  2 Sheets-Sheet 2

INVENTOR:
DONALD A. PAYNTER,
BY *Marvin L. Goldenberg*
HIS ATTORNEY.

United States Patent Office 3,080,534
Patented Mar. 5, 1963

3,080,534
BRIDGE-TYPE TRANSISTOR CONVERTER
Donald A. Paynter, Syracuse, N.Y., assignor to General
Electric Company, a corporation of New York
Filed Apr. 11, 1960, Ser. No. 21,251
5 Claims. (Cl. 331—113)

The present invention relates to transistor converters and more particularly to transistor converters connected in a bridge-type configuration. Such transistor converters may be employed as D.-C. to A.-C. or D.-C. to D.-C. power converters of the multivibrator type, low frequency oscillators, modulators and amplifiers, etc.

Transistor converters have been proposed utilizing two alternately conducting transistors which alternately switch a source of direct voltage across the halves of a center-tapped primary winding of a saturable core transformer causing current to flow in the winding halves in opposing directions. The multivibrator switching action of the transistors is controlled by feedback windings of opposite polarity associated therewith wherein the conduction and nonconduction of one transistor is responsive to the nonconduction and conduction, respectively, of the other transistor. A square wave voltage is produced at an output winding in response to alternate switching of the transistors which may be used in its A.-C. form or may be rectified to provide a direct voltage. One form of such transistor converters is disclosed in applicant's U.S. Patent No. 2,826,731.

The transistor converter circuits of the type described above are characterized by many superior qualities such as high operating efficiency and simplicity of design. The present invention together with retaining these advantages includes the additional advantages of making more efficient use of the transformer windings and in permitting a higher level of voltage operation with transistors of limited voltage handling capabilities. This effects an increase in the output power. The configuration of the present invention also permits a reduction in undesirable transient inductive voltages. It further eliminates the necessity for a critically center tapped transformer, required in the prior art converter circuits.

Accordingly, it is an object of the invention to provide novel transistor converter circuits of a configuration permitting optimum utilization of the transformer windings and enhanced high voltage operation.

It is another object of the invention to provide novel bridge-type transistor converter circuits which permit optimum utilization of the transformer windings and which provide enhanced high voltage operation.

It is still another object of the invention to provide novel bridge-type transistor converter circuits whose output voltage may be controlled in response to an electrical input signal.

It is another object of the invention to provide novel bridge-type transistor converter circuits characterized by reduced transient inductive voltages.

It is a further object of the invention to provide novel bridge-type transistor converter circuits wherein protection from high inductive currents is afforded to the transistors thereof.

Briefly, in accordance with one aspect of the invention, a transistor bridge circuit is employed to couple a source of direct voltage to the input winding of a saturable core transformer. The direct voltage source is coupled between one pair of diagonally opposed junctions of the bridge circuit, and the input winding is connected between the other pair of diagonally opposed junctions of said bridge circuit. The bridge comprises four transistors of the same type, each having a control element. Feedback windings are coupled to the control elements of the transistors for controlling alternate conduction of said transistors in pairs, providing current flow through said input winding first in one direction and then in an opposite direction. The feedback windings coupled to one transistor pair are wound with a first polarity and the feedback windings coupled to the other transistor pair are wound with a polarity opposite to said first polarity. Said feedback windings have control voltages induced therein responsive to the current flow in said input winding for effecting the alternate conduction of said transistor pairs. An output load connected across said input winding receives an alternating voltage output.

In accordance with a further aspect of the invention the transistors of each of said transistor pairs are of complimentary types, one being NPN and the other PNP, thereby requiring only two feedback windings. Each of the feedback windings are coupled to the control elements of two complimentary type transistors for applying opposite control signals thereto.

In accordance with an additional aspect of the invention transistors of a single type requiring only two feedback windings are employed. The control windings are respectively coupled to the feedback elements of one of the transistors of each of said transistor pairs, the remaining transistors being driven by the outputs of their respective mates.

In accordance with still another aspect of the invention "conduct" and "cut off" bias voltages are provided by two separate sources. The feedback windings are coupled to the control elements of their respective transistors through a diode so as to apply only cut off potentials to said transistors. Control signals from external input sources are applied to said control elements for controlling the "ON" operation of said transistors for such purposes as output voltage regulation.

While the specification concludes with claims particularly pointing out and distinctly claiming the subject matter which is regarded as the invention, it is believed that the invention will be better understood as the following description is taken in connection with the accompanying drawings in which:

Figure 1:
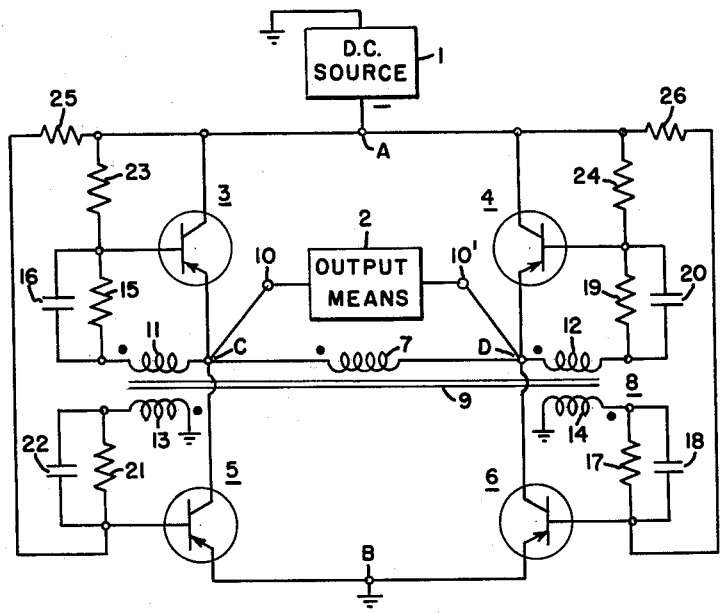
FIGURE 1 is a schematic diagram of one embodiment of applicant's bridge-type transistor converter circuit employing a single transistor type, each transistor having a feedback winding associated therewith.

Referring now to FIGURE 1, there is illustrated a bridge-type transistor converter circuit for converting the voltage from a direct voltage source 1 into an alternating voltage which is applied to output means 2. Output means 2 comprises the loading device which may be of the resistive, inductive and/or capacitive type, connected directly across output terminals 10 and 10' or to the secondary of a convention transformer whose primary is connected to terminals 10 and 10'. The output means may also comprise a rectifier circuit, such as a full wave bridge rectifier, for changing the alternating voltage to a direct voltage. The transistor converter circuit comprises four PNP transistor devices 3, 4, 5 and 6 connected in a bridge configuration having four arms, each of said transistors being connected in one of the arms. The transistors, which operate in pairs as high efficiency switches, alternately couple the negative voltage source 1 across the primary or input winding 7 of a saturable core transformer 8 in one of two directions. This creates an alternating flux change in the transformer core 9. Transistor switching occurs each time core 9 saturates. Core 9 preferably has a substantially square loop hysteresis characteristic so as to provide a precisely defined switching action.

Source 1 has its negative high voltage terminal connected to junction A of the bridge, which junction is common to the collector electrodes of transistors 3 and 4. The positive terminal of source 1 is connected to the diagonally related junction B of said bridge, which is commonly connected to the emitter electrodes of transistors 5 and 6 and to ground. Primary winding 7 has one terminal thereof connected to a third junction C of said bridge, to which is also connected the emitter electrode of transistor 3 and the collector electrode of transistor 5. The other terminal of winding 7 is connected to the diagonally related junction D, to which is also connected the emitter electrode of transistor 4 and the collector electrode of transistor 6. The transistors alternately conduct in pairs, transistors 3 and 6 conducting together, and transistors 4 and 5 conducting together. When transistors 3 and 6 are conducting, transistors 4 and 5 are nonconducting and vice versa. Thus, current is caused to flow through primary winding 7 in alternating directions, in accordance with the path provided by the transistor conduction. The alternating voltage across winding 7 also appears across output terminals 10 and 10′, connected respectively to junctions C and D, and is thus applied to output means 2.

Alternating conduction is provided by control signals from feedback windings 11, 12, 13 and 14, which have induced therein voltages resulting from the current flow in primary winding 7. Each winding is coupled to one of said transistors. Windings 11 and 14 are wound with the same polarity relative to their associated transistors 3 and 6. Windings 12 and 13 are wound with the same polarity relative to their associated transistors 4 and 5, but reverse with respect to windings 11 and 14. This polarity pattern is indicated in FIGURE 1 by the dots. Feedback winding 11 is connected by the parallel circuit of resistance 15 and capacitor 16 from the emitter electrode of transistor 3, or bridge junction C, to the base electrode thereof. The winding is of such polarity as to have induced therein a voltage which applies a negative control signal to the base electrode of transistor 3, when transistors 3 and 6 are conducting and current flow in primary winding 7 is from right to left (as viewed in the drawing). This tends to drive the transistor further into saturation. Winding 14 is connected by the parallel circuit of resistor 17 and capacitor 18 from the grounded emitter electrode of transistor 6, or bridge junction B, to the base electrode thereof, and has an induced voltage which applies a negative control signal to the base electrode of transistor 6 when transistors 3 and 6 are conducting. Conversely, windings 11 and 14 have an opposite polarity voltage induced therein when transistors 4 and 5 are conducting and current flow is from left to right in winding 7. For this portion of the operation they apply a positive control signal to the base electrodes of transistors 3 and 6, driving these transistors into cut off.

Feedback winding 12 is connected by the parallel circuit of resistor 19 and capacitor 20 from bridge junction D to the base electrode of transistor 4, and winding 13 is connected by the parallel combination of the resistor 21 and capacitor 22 from bridge junction B to the base electrode of transistor 5. Windings 12 and 13 are of such polarity as to have induced therein voltages which apply a negative control signal to their respective base electrodes when transistors 4 and 5 are conducting, maintaining these transistors conducting. Conversely, during conduction of transistors 3 and 6, windings 12 and 13 have induced therein voltages of opposite polarity which apply a positive control signal to their base electrodes, maintaining transistors 4 and 5 cut off. It should be understood that the positive and negative bias voltages developed in the feedback windings, as described above, take place only while the core 9 is experiencing a flux change below the saturating point. When the core saturates these voltages will be seen to reverse.

Resistors 23, 24, 25 and 26 are respectively connected from bridge junction A to the base electrodes of transistors 3 to 6 and provide an initial forward bias condition to the transistors. This initial bias aids in initiating the multivibrator-like action when the circuit is first energized. These resistors are normally large in value so as to draw a minimum of base current. After the multivibrator operation commences, these resistors exert no further control in the circuit.

Considering now the operation of the circuit of FIGURE 1, we will assume that transistors 3 and 6 are initially conducting and transistors 4 and 5 are nonconducting. Thus, current will flow from ground through transistor 6, from right to left through primary winding 7 and through transistor 3 to negative D.-C. source 1. The current flow in winding 7 produces a flux change in the core 9 which induces a voltage in windings 11 and 14 such as to apply a negative control signal to the base electrodes of transistors 3 and 6, thus maintaining the already occurring conductiong therein. The flux change in core 9 also induces a voltage in windings 12 and 13 which applies a positive control signal to the base electrodes of transistors 4 and 5, maintaining these transistors nonconducting. This situation continues until the core flux has increased to the saturation level whereupon substantially no further flux changes can occur. Thus, upon saturation of core 9, the induced voltages in the control windings 11 to 14 diminish, effecting a rapid decrease in the conduction of transistors 3 and 6 and a rapid decrease in the current flow through winding 7. This decrease of current flow through winding 7 reduces the flux in core 9 and induces a voltage in feedback windings 11 to 14 in a direction opposite to the initial voltage condition therein. Hence, positive voltages are induced in windings 11 and 14 which are applied to the base electrodes of transistors 3 and 6, switching these transistors into cut off. Concurrently, negative voltages are induced in windings 12 and 13 which are applied to the base electrodes of transistors 4 and 5, initiating conduction in these transistors. During this portion of the operation, current flows from ground through transistor 5, from left to right through winding 7 and through transistor 4 to source 1. This further induces a positive voltage in windings 11 and 14 and a negative voltage in windings 12 and 13 to maintain transistors 3 to 6 in their changed state. This situation will continue until the core flux again saturates which causes the induced voltages in the feedback windings to again reverse, cutting off transistors 4 and 5 and turning "ON" transistors 3 and 6. This operation will continue with the transistor pairs alternately conducting, thereby providing an A.-C. voltage across output terminals 10 and 10′, which is applied to output means 2.

The substantially rectangular hysteresis characteristic of core 9 provides a precise point of saturation, causing an accurate and rapid switching action in the transistors. This precise switching action is further enhanced by the parallel resistance and capacitance circuits associated with the base electrodes which act to provide large bias currents during the relatively brief switching intervals while limiting the bias currents during the steady conducting intervals. The capacitance of the parallel resistance-capacitance networks is sufficient to apply to the base electrodes substantially all of the voltage initially induced in the associated secondary windings, as the core is initially switched. This aids in causing a sharp increase in bias current in the transistors 3 to 6, hastening full conduction in one transistors pair and non-conduction in the other transistor pair. The bias current is limited by the resistance of the parallel networks as the induced voltage reaches a relatively constant value. The frequency of the alternating output voltage is determined by the material and dimensions of the core, the number of turns on the various windings and by the magnitude of the applied D.-C. voltage.

In one operative embodiment of the circuit of FIGURE 1 wherein there was obtained an A.-C. power output of 200 watts at an operating frequency of 400 cycles per second, the following component values were employed. These components are presented only for purposes of illustration and are not to be construed as limiting.

| | |
|---|---|
| Core 9 | Orthonal core, manufactured by Magnetics, Inc., #50035-2A. |
| Input winding 10 | 85 turns, No. 14 wire. |
| Feedback windings 11, 12, 13 and 14 | 8 turns, No. 27 wire. |
| Transistors 3, 4, 5 and 6 | 2N174 type power transistors. |
| Resistors 15, 17, 19, 21 | 3 ohms. |
| Capacitors 16, 18, 20, 22 | 5 microfarads. |
| Resistors 23, 24, 25, 26 | 2,000 ohms. |
| D. C. source 1 | 28 volts. |

Figure 2:
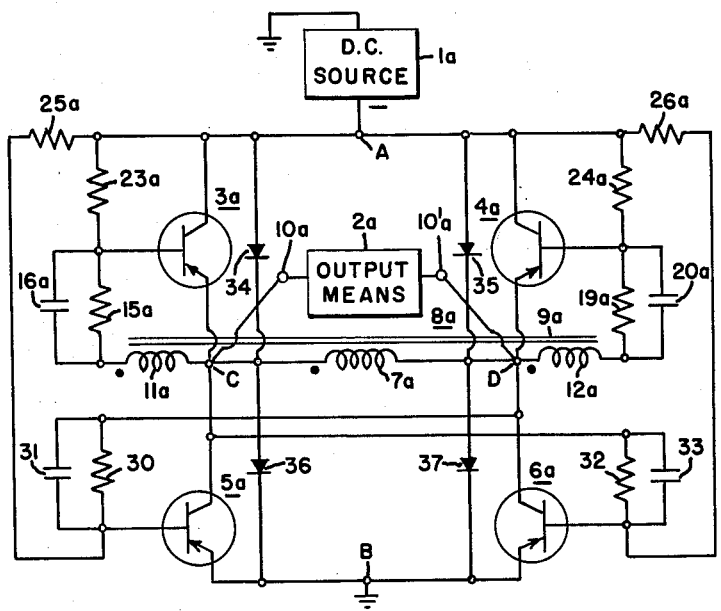
FIGURE 2 is a schematic diagram of still another embodiment of applicant's bridge-type transistor converter circuit employing a single type transistor and two feedback windings.

Referring now to FIGURE 2, there is illustrated another embodiment of applicant's bridge-type transistor converter circuit. The circuit configuration may be seen to be similar to that of FIGURE 1, except that the lower transistors 5a and 6a are driven into and out of conduction by the output of their respective mates, transistors 4a and 3a, by means of the parallel networks of resistor 30, capacitor 31 and resistor 32, capacitor 33. Thus, only two feedback windings, coupled to transistors 4a and 3a, are required. In addition, protective diodes 34, 35, 36 and 37 are employed. The remaining components of the circuit are identical to those of FIGURE 1 and are similarly designated, but with an added "a" notation. Although the present circuit eliminates two of the feedback windings required in FIGURE 1, the latter circuit dissipates less energy, as will be explained.

The base drive for transistor 5a is obtained by connecting the parallel network of resistor 30 and capacitor 31 from the base electrode of transistor 5a to junction D, connected to the emitter of transistor 4a. Similarly, transistor 6a receives its base drive by connecting the parallel network of resistor 32 and capacitor 33 from the base of transistor 6a to junction C, at the emitter of transistor 3a. Since it may be seen that substantially the entire source voltage is impressed across these parallel networks during portions of the operation, resistors 30 and 32 must be large enough so as to limit the base currents to a value that will not damage the transistors. Similarly, capacitors 31 and 33 must be sufficiently small so as to prevent unduly large current surges from being applied to the base electrodes during the switching intervals. Or alternatively, an additional limiting resistor can be inserted in series with each of the capacitors.

Protective diodes 34 to 37 serve to bypass inductive currents around the transistors whenever the induced reactive voltages in the windings of either polarity exceed the supply voltage. These inductive currents may be caused by highly inductive loading or, when other than square loop core materials are employed, by the inductance of the transformer itself. Diode 34 is connected at its anode to the collector of transistor 3a and at its cathode to the emitter of transistor 3a. Diode 35 is connected at its anode to the collector of transistor 4a and at its cathode to the emitter of transistor 4a. Diode 36 is connected at its anode to the collector of transistor 5a and at its cathode to the emitter of transistor 5a, and diode 37 is connected at its anode to the collector of transistor 6a and at its cathode to the emitter of transistor 6a. It may be recognized that these protective diodes may be similarly connected in the circuit of FIGURE 1. The remaining components of the circuit are connected identically as in the circuit of FIGURE 1.

In the operation of the circuit of FIGURE 2, we will assume that transistors 3a and 6a are initially conducting and transistors 4a and 5a are nonconducting. Thus as before, current flows from ground through transistor 6a, from right to left through primary winding 7a and through transistor 3a to the negative D.-C. source 1a. Current flow in this direction through winding 7a induces a negative voltage in winding 11a, maintaining transistor 3a conducting. Accordingly, the voltage at junction C becomes highly negative and provides a negative bias signal to the base of transistor 6a through the parallel circuit of resistor 32 and capacitor 33, such as to maintain transistor 6a conducting. Concurrently, a positive voltage is induced in winding 12a such as to maintain transistor 4a nonconducting. At this time the voltage at junction D is but slightly negative, due to the low impedance state of transistor 6a. This voltage, being applied to the base of transistor 5a, is insufficient to cause conduction and this transistor remains nonconducting.

When core 9a saturates, a reversal of the induced voltages in windings 11a and 12a occurs, as explained with reference to FIGURE 1. Thus, transistor 3a will be cut off by the voltage in winding 11a, and this in turn cuts off the conduction of transistor 6a. The voltage in winding 12a causes transistor 4a to be switched into conduction, which drives transistor 5a into the conduction state. With transistors 4a and 5a conducting, a current path is provided from left to right through primary winding 7a. As previously with respect to FIGURE 1, flow of current in this direction induces a negative voltage in winding 12a, which maintains transistors 4a and 5a conducting, and a positive voltage is induced in winding 11a, thereby maintaining transistors 3a and 6a cut off. This condition continues until the core once again saturates whereupon the operation again reverses. Thus, an A.-C. voltage appears across output terminals 10a and 10'a, which is applied to output means 2a.

Figure 3:
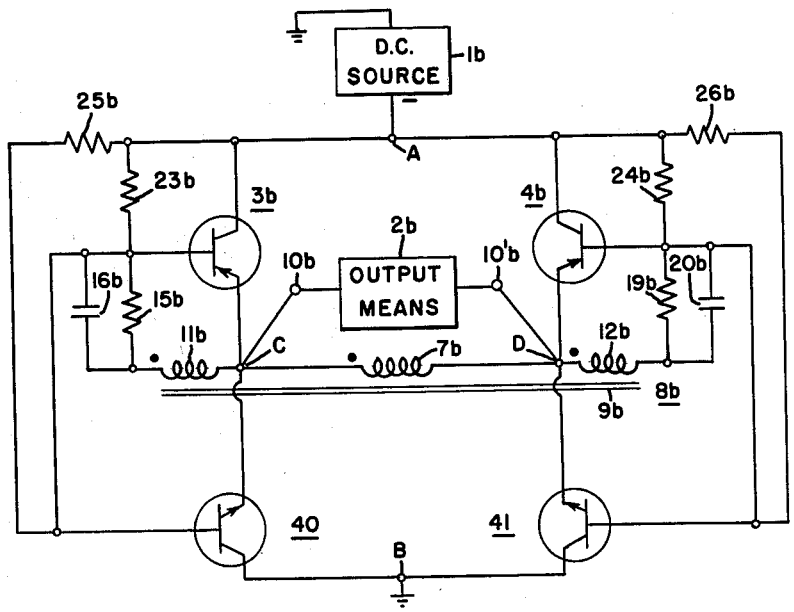
FIGURE 3 is a schematic diagram of another embodiment of applicant's bridge-type converter circuit employing NPN and PNP transistors and requiring but two feedback windings.

In FIGURE 3 is shown an embodiment of applicant's bridge-type transistor converter circuit employing both PNP and NPN type transistors and requiring only two feedback windings and two parallel resistance-capacitance networks. NPN transistors 40 and 41 now replace transistors 5 and 6 of FIGURE 1. The circuit is otherwise similar to FIGURE 1 and similar components are given a similar designation, with a "b" notation. Transistors 40 and 41 obtain their bias signal from the feedback circuits of transistors 3b and 4b. Thus, the base electrodes of transistors 40 and 41 are connected to the base electrodes of transistors 3b and 4b, respectively. The remainder of the circuit is connected as in FIGURE 1. If desired protective diodes may be shunted across the transistors for inductive loading, similar to FIGURE 2.

In the operation of the circuit of FIGURE 3, transistors 3b, 4b, 40 and 41 alternately conduct in pairs to provide a square wave alternating voltage in primary winding 7b, as previously. In lieu of providing individual feedback circuits for the lower transistors, as in FIGURE 1, transistors 40 and 41 conveniently receive the same bias signal as supplied to transistors 3b and 4b, respectively. These bias signals exert an opposite control on the conduction of NPN transistors 40 and 41 as they do with respect to PNP transistors 3b and 4b, thus effecting the desired transistor operation.

Figure 4:
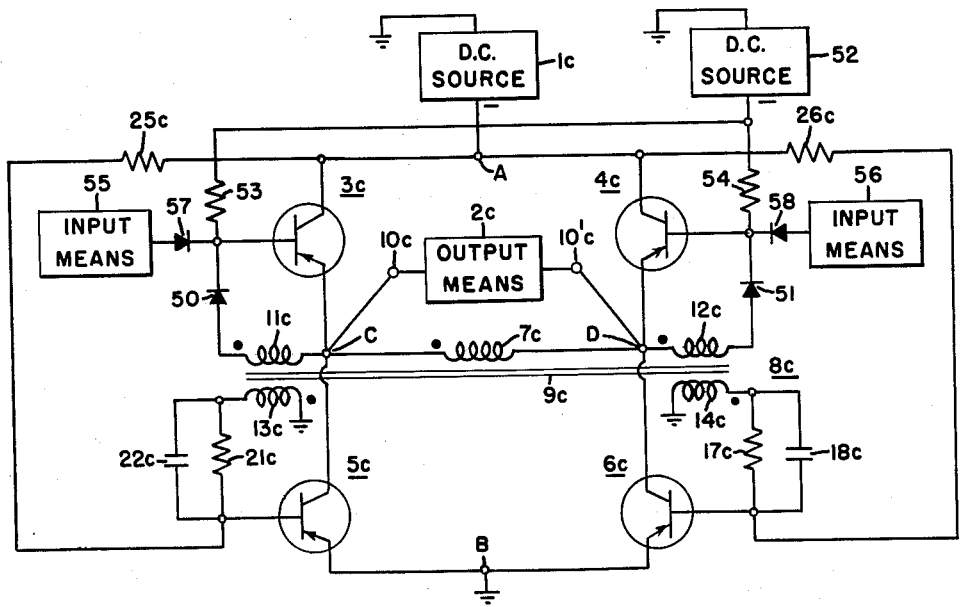
FIGURE 4 is a schematic diagram of yet another embodiment of applicant's bridge-type converter circuit employing a base-controlled operation.

Considering now FIGURE 4, there is illustrated a bridge-type transistor converter circuit employing a form of base-controlled transistor operation for varying the amplitude of the output voltage in accordance with an input signal. The circuit may thus function as a low frequency amplifier, modulator or regulated power supply. The base-controlled operation is of the type disclosed in applicant's copending application, Serial No. 15,652, filed March 17, 1960, assigned to the assignee of the instant application. It is noted that in the circuits of the foregoing figures, the transistors are operated as switches, being either fully conducting or nonconducting. In the circuit of FIGURE 4, however, at least one of the transistors of the bridge is operated in a linear or dissipative mode, wherein the conductivity of the transistor is varied. Accordingly, the linear operated transistors act as variable impedances for coupling varying portions of the voltage from source 1c across primary winding 7c. This form of operation is accomplished by separating the "ON" and "OFF" control functions so that the feedback windings apply only a positive cut off signal, with an external controllable bias source employed to control the "ON" portion of the transistor operation.

The circuit configuration is basically similar to that of FIGURE 1 and similar components are designated in a similar fashion, with a "c" notation. Examining the circuitry associated with transistors 3c and 4c, feedback winding 11c is restricted to supplying only cut off signals to transistor 3c by diode 50 which connects feedback winding 11c to the base electrode of transistor 3c, the diode being poled so as to pass only positive signals to the base electrode. Similarly, diode 51 connects feedback winding 12c to the base electrode of transistors 4c, the diode being poled to conduct only positive bias signals to the base. The external controllable bias circuitry includes a relatively constant current source for each of the base-controlled transistors 3c and 4c. The constant current source comprises a negative direct voltage source 52 connected to the base electrodes of transistors 3c and 4c by resistors 53 and 54, respectively, for providing independent negative bias signal thereto. Values for the direct voltage source 52 and the resistors 53 and 54 are selected so as to provide a fairly constant bias current to the base electrodes for all degrees of conductivity of transistors 3c and 4c and for all anticipated load currents. Because of the common collector connection of transistors 3c and 4c, source 52 is preferably considerably greater, more negative, than source 1c. The aforementioned negative bias signals applied to transistors 3c and 4c may be varied by input signals from input means 55 and 56 which are respectively connected through diodes 57 and 58 to the base electrodes of transistors 3c and 4c. Input means 55 and 56, in accordance with the input signals generated therein, serve to shunt away from the base electrodes of transistors 3c and 4c varied portions of the bias supplied thereto by the constant current source, thereby controlling the conduction of these transistors. The anodes of diodes 57 and 58 are respectively connected to the input means 55 and 56, and the cathodes of said diodes are connected respectively to the base electrodes of transistors 3c and 4c. The circuit is otherwise connected as in FIGURE 1.

Considering now the operation of the circuit of FIGURE 4, transistor pairs 3c, 6c and 4c, 5c alternately conduct as previously. However, now transistors 3c and 4c may be of variable conductivity during their conducting operation so that the amplitude of the output signal may be controlled in accordance with the input signals from input means 55 and 56. Thus, assuming transistors 3c and 6c to be initially conducting, a negative voltage is induced in windings 11c and 14c and a positive voltage is induced in windings 12c and 13c. The positive voltages in windings 12c and 13c are respectively applied to the base electrodes of transistors 4c and 5c by diode 51 and the parallel circuit of resistor 21c and capacitor 22c, maintaining these transistors in a cut off condition. The negative voltage from winding 14c is applied to the base electrode of transistor 6c through the parallel circuit of resistor 17c and capacitor 18c, maintaining this transistor in the conducting state. The negative voltage induced in winding 11c is prevented from being applied to the base electrode of transistor 3c by diode 50. Transistor 3c instead receives a negative bias signal from input means 55 which effects a controlled conductivity of said transistor. Similarly, during the portion of the operation when transistors 4c and 5c are conducting feedback winding 11c applies a positive cut off signal to the base electrode of transistor 3c through diode 50, and transistor 4c receives its negative bias signal from input means 56, the negative signal in feedback winding 12c being blocked by diode 51.

The circuit illustrated in FIGURE 4 is intended to show a basic base-controlled operation for a bridge-type transistor converter. Where necessary, protective diodes may be shunted across the transistors, as disclosed with relation to FIGURE 2. Numerous modifications may be readily made to the circuit, many of which are disclosed in applicant's copending application, previously referred to. For example, the direct voltage source 52 may be replaced by two additional feedback windings on core 9c, each wound serially with a corresponding one of the windings 11c and 12c, but with opposite polarity thereto, for applying negative bias signals to the upper transistors. Further, the feedback windings 11c and 12c can be alternately connected across series resistors connected to the base electrode of transistors 3c and 4c, diodes 50 and 51 being connected between the feedback windings and said base electrodes. Such series feed control is clearly illustrated in the aforementioned copending application.

In another modification all four of the transistors may be controlled by input signals from an external bias source, providing a more even distribution of the energy dissipation across the transistors. Alternatively, the input signals may be applied to only the lower transistors 5c and 6c, connected in a common emitter configuration. It may also be appreciated that base-controlled operation similar to FIGURE 4 may be employed in the configurations of FIGURES 1 to 3.

It is apparent that other than transistor devices may be utilized for the switching transistors of FIGURES 1 to 4. For example, three terminal PNPN devices may be employed. In addition, for high voltage applications it may be desirable to employ vacuum tubes to perform the switching and amplifying functions in the various circuit configurations.

The above as well as any and all modifications that fall within the real scope of the invention are intended to be included in the following appended claims.

What I claim as new and desire to secure by Letters Patent of the United States is:

1. An electric circuit for converting direct voltage to alternating voltage comprising a first and second pair of transistors, each transistor having base, emitter and collector electrodes, a saturable core transformer having an input winding and feedback winding means, output means connected across said input winding, a source of direct voltage, first means for serially connecting in the order recited the emitter to collector path of one of the transistors of said first transistor pair, said input winding, and the emitter to collector path of the other transistor of said first transistor pair to said direct voltage source for providing current flow in one direction through said input winding, second means for serially connecting in the order recited the emitter to collector path of one of the transistors of said second pair, said input winding, and the emitter to collector path of the other transistor of said second transistor pair to said direct voltage source for providing current flow through said input winding in a direction opposite to said one direction, said feedback winding means having separate windings connected with the base electrodes of each of said transistors for applying opposite polarity bias signals thereto in response to current flow through said input winding for causing conduction in one of said transistor pairs and nonconduction in the other said transistor pairs, said bias signals being of alternating polarity so as to provide alternating conduction of said transistor pairs whereby an alternating voltage appears across said input winding and is applied to said output means, said one transistors of each transistor pair are alike and are of a complementary type to said other transistors, the emitter electrode of said one transistor of said first transistor pair being joined at a first junction to the emitter electrode of said other transistor of said second transistor pair, the emitter electrode of said one transistor of said second transistor pair being joined at a second junction to the emitter electrode of said other transistor of said first transistor pair, and wherein said feedback winding means comprises two feedback windings, one of said feedback windings being connected from said first junction by a first parallel resistance-capacitance network jointly to the base electrode of said one transistor of said first transistor pair and to the base electrode of said other transistor of said second transistor pair, the other of said feedback windings being connected from said second junction by a second parallel resistance-capacitance network jointly to the base electrode of said one transistor of said second transistor pair and to the base electrode of said other transistor of said first transistor pair.

2. An electric circuit for converting direct voltage to alternating voltage comprising a first and second pair of transistors, each transistor being of the same conductivity type and having base, emitter and collector electrodes, a saturable core transformer having an input winding and two feedback windings, output means connected across said input winding, a source of direct voltage, first means for connecting the emitter to collector path of one of the transistors of said first transistor pair, said input winding, and the emitter to collector path of the other transistor of said first transistor pair in series in the order recited to said direct voltage source for providing current flow in one direction through said input winding, second means for connecting the emitter to collector path of one of the transistors of said second transistor pair, said input winding, and the emitter to collector path of the other transistor of said second transistor pair in series in the order recited to said direct voltage source for providing current flow through said input winding in a direction opposite to said one direction, one of said feedback windings being connected in series with a parallel resistance-capacitance network between the emitter and base electrodes of said one transistor of said first transistor pair, the other of said feedback windings being connected in series with a parallel resistance-capacitance network between the emitter and base electrodes of said one transistor of said second transistor pair, said feedback windings being connected to provide bias signals of opposite polarities in response to current flow through said input winding for causing alternate conduction of said one transistors, the emitter electrode of said one transistor of said first transistor pair being connected through a third parallel resistance-capacitance network to the base electrode of the other transistor of said first transistor pair for providing a bias for maintaining the other transistor in the same state of conduction as its paired one transistor, the emitter electrode of said one transistor of said second transistor pair being connected by a fourth parallel resistance-capacitance network to the base electrode of the other transistor of said second transistor pair for providing a bias for maintaining the other transistor in the same state of conduction as its paired one transistor whereby an alternating voltage appears across said input winding and is applied to said output means.

3. An electric circuit for converting direct voltage to alternating voltage comprising a first and second pair of unilaterally conducting devices, each device having a conduction control element; a saturable core transformer having an input winding and two feedback windings; a source of direct voltage; one of said first pair of unilaterally conducting devices, said input winding, and the other of said first pair of unilaterally conducting devices being connected in series in the order recited to said direct voltage source to provide current flow through said input winding in one direction; one of said second pair of unilaterally conducting devices, said input winding, and the other of said second pair of unilaterally conducting devices being connected in series in the order recited to said direct voltage source to provide current flow through said input winding in a direction opposite to said one direction; and means responsive to voltages in one feedback winding for applying control potentials to the control elements of two of said unilaterally conducting devices and responsive to voltages in the other feedback winding for applying control potentials to the control elements of the remaining unilaterally conducting devices to provide alternate conduction of said first and second pairs of amplifying devices.

4. The electric circuit set forth in claim 3 wherein said unilaterally conducting devices are transistors, said one unilaterally conducting devices of each pair being of like conductivity type and of a complementary type to said other unilaterally conducting devices of each pair; and wherein one feedback winding is coupled to said one unilaterally conducting device of said first pair and to the other unilaterally conducting device of said second pair and the other feedback winding is coupled to the remaining unilateral conducting devices.

5. The electric circuit set forth in claim 3 wherein said unilaterally conducting devices are transistors; and wherein one feedback winding is coupled to a unilaterally conducting device of said first pair and the other feedback winding is coupled to a unilaterally conducting device of said second pair, and the remaining unilaterally conducting devices of each pair have their control elements coupled to the output of the unilaterally conducting device in its pair for concurrent operation of the members of each pair.

References Cited in the file of this patent
UNITED STATES PATENTS 2,821,639    Bright et al.  ------------ Jan. 28, 1958
2,946,022    Davis  ---------------- July 19, 1960

OTHER REFERENCES

Article by Campling in Electronics, March 14, 1958, pages 158 to 161.

Mullard Tech. Commun., December 1958, No. 36, pages 191, 192.

Article by Butler et al. in Electronic Engineering, July 1959, pages 412 to 418.

Notice of Adverse Decision in Interference

In Interference No. 93,970 involving Patent No. 3,080,534, D. A. Paynter, BRIDGE-TYPE TRANSISTOR CONVERTER, final judgment adverse to the patentee was rendered Dec. 14, 1965, as to claims 3, 4 and 5.

[*Official Gazette February 15, 1966.*]